(12) United States Patent
Liang et al.

(10) Patent No.: US 7,324,508 B2
(45) Date of Patent: Jan. 29, 2008

(54) CROSSBAR SWITCHING CIRCUIT AND OPERATING METHOD THEREOF

(75) Inventors: Ching-Jer Liang, Hsinchu Hsien (TW); Min-Chin Yang, Hsinchu County (TW)

(73) Assignee: Faraday Technology Corp., Hsin-Chu (TW)

( * ) Notice: Subject to any disclaimer, the term of this patent is extended or adjusted under 35 U.S.C. 154(b) by 536 days.

(21) Appl. No.: 10/906,661

(22) Filed: Mar. 1, 2005

(65) Prior Publication Data

US 2006/0198366 A1    Sep. 7, 2006

(51) Int. Cl.
*H04Q 11/00*    (2006.01)
*H04L 12/50*    (2006.01)
*H04J 3/16*     (2006.01)
*H04J 3/22*     (2006.01)

(52) U.S. Cl. ...................... 370/380; 370/468
(58) Field of Classification Search ........... 370/351, 370/357, 360, 375, 380, 395.21, 442, 468
See application file for complete search history.

(56) References Cited

U.S. PATENT DOCUMENTS 5,363,373 A * 11/1994 Nakahara et al. ........... 370/314
6,674,750 B1 * 1/2004 Castellano ................. 370/354
6,683,872 B1 * 1/2004 Saito et al. ................ 370/380
2004/0001483 A1 * 1/2004 Schmidt et al. ............ 370/364

* cited by examiner

*Primary Examiner*—Hassan Kizou
*Assistant Examiner*—Betty Lee
(74) *Attorney, Agent, or Firm*—Winston Hsu

(57) ABSTRACT

A crossbar switching circuit and operating method thereof for coupling a plurality of source providers to a plurality of source consumers based on the request of the source consumer are provided. The crossbar switching circuit includes a plurality of source consumer terminals coupled to the source consumers respectively, a plurality of source provider terminals coupled to the source providers respectively, a plurality of first counters and a plurality of second counters. Wherein, each source consumer terminal has one first counter and one second counter. The first counter indicates a current latency state of the resource requested by the corresponding source consumer. The second counter indicates a current bandwidth state of resource requested by the corresponding source consumer. In addition, the connecting states between the source consumer terminals and the source provider terminals are determined based on the states of the first counters and the second counters.

9 Claims, 3 Drawing Sheets

CROSSBAR SWITCHING CIRCUIT AND OPERATING METHOD THEREOF

BACKGROUND OF THE INVENTION

1. Field of the Invention

The present invention relates to a switching circuit and an operating method thereof, and more particularly, to a crossbar switching circuit capable of ensuring minimum latency and sustain bandwidth and a method for operating the same.

2. Description of Related Art

Fixed bus mode is commonly used in a general system such as SOC (system on chip) for connecting all functional modules inside a system chip (i.e. all of the source consumers and source providers) by using one or more system buses. If there are too many functional modules in a SOC chip, such system connecting method may cause a problem such as poor efficiency of accessing source providers (e.g. system memory), and it cannot provide a QOS (quality of service) function, which guarantees real time sustained bandwidth, to source consumers which require a guaranteed response time (e.g. guaranteed reading time).

Therefore, recently a connection method similar to the switching hub used in Local Area Network (LAN) had been applied on some SoC chips that provide more complicated functions to enhance the efficiency of accessing the source providers such as system memory. Such connection method such as the switching hub used in LAN environment is referred to as a crossbar switching configuration. However, the currently used crossbar switching configuration lacks the capability of providing the QOS (quality of service) function which guarantees real time sustained bandwidth.

SUMMARY OF THE INVENTION

Accodingly, the present invention is directed to a crossbar switching circuit capable of ensuring QOS guaranteeing real time sustained bandwidth allowing a highly efficient access to source providers allowing retrieval of information there-from.

The present invention is also directed to a method of operating the crossbar switching circuit capable of ensuring QOS guaranteeing real time sustained bandwidth allowing a highly efficient access to source providers allowing retrieval of information there-from.

According to an embodiment of the present invention, the crossbar switching circuit is capable of coupling a plurality of source providers to a plurality of source consumers according to the request of the source consumers. The crossbar switching circuit comprises a plurality of source consumer terminals, a plurality of source provider terminals, a plurality of first counters and a plurality of second counters. Each source consumer terminal is coupled to a corresponding source consumer, respectively. Each source provider terminal is coupled to the corresponding source provider, respectively. Each source consumer terminal has a first counter and a second counter, wherein a first predetermined value and a first initial value of the corresponding first counter are both preset based on the request of each source consumer for indicating a current latency state of a resource requested by the corresponding source consumer. A second predetermined value and a second initial value of the corresponding second counter are both preset based on different request of each source consumer for indicating a current bandwidth state of the resource requested by the corresponding consumer. In addition, the connecting states between the source consumer terminals and the source provider terminals are determined based on the states of the first counters and the second counters.

According to an embodiment of the present invention, the method of operating the crossbar switching circuit includes dividing a coupling timing between the source consumers and the source providers into a plurality of frames, and then dividing each frame into a plurality of slots. Next, each first counter is initiated for counting a number of the elapsed frames starting from its first initial value and then the first counter of each source consumer terminal is checked, and a specific number of slots are allotted to current source consumer terminal according to a counting value of the corresponding second counter when one of the first counters has reached its first predetermined value and a specific number of slots are allotted to current source consumer terminal according to the counting value of the second counter when one of the first counters is disabled.

According to an embodiment of the present invention, the step of allocating a specific number of slots to current source consumer terminal according to the corresponding second counter comprises: allocating a specific number of slots to current source consumer terminal when the corresponding second counter has not reached the second predetermined value, and enabling the second counter to count the number of the allocated slots; and resetting the second counter to its corresponding second initial value when the corresponding second counter has reached the second predetermined value.

Accordingly, the crossbar switching configuration, according to an embodiment of the present invention, is capable of promoting the efficiency of accessing the source providers such as system memory. In addition, since a TDMA (Time Division Multiple Access) access method is used, and a current latency state and a current bandwidth state are indicated by the first counter and the second counter respectively, thus, the present invention is capable of providing the QOS function for guaranteeing real time sustained bandwidth.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF EMBODIMENTS

Figure 1:
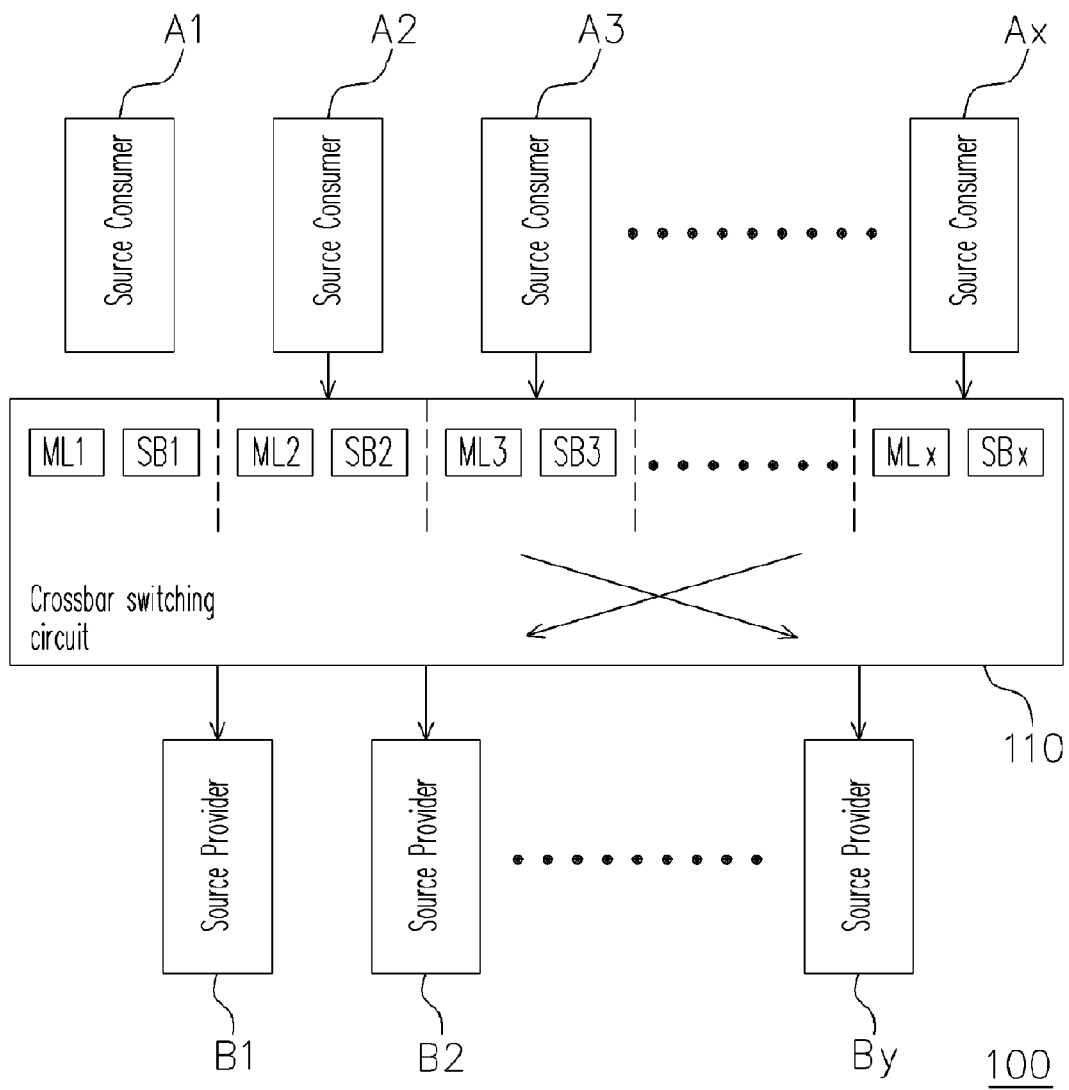
FIG. 1 schematically shows a circuit diagram of a crossbar switching circuit according to an embodiment of the present invention.

A SOC (system on chip) is exemplified in following embodiments for easily describing the concept of the present invention. FIG. 1 schematically shows a circuit diagram of a crossbar switching circuit according to an embodiment of the present invention. Referring to FIG. 1, all of the functional modules inside the SOC 100 (e.g. all of the source consumers A1~Ax and the source providers B1~By shown in the diagram) are coupled to a crossbar switching circuit 110. The crossbar switching circuit 110 comprises a plurality of source consumer terminals that are coupled with the source consumers A1~Ax respectively, and a plurality of source provider terminals that are coupled with the source providers (e.g. system memory) B1~By respectively.

Each source consumer terminal has a first counter ML and a second counter SB. For example, the source consumer terminal coupled to the source consumer A2 has a first counter ML2 and a second counter SB2. The first counter (e.g. ML2) indicates a current latency state of a resource requested by the corresponding source consumer (e.g. A2), so as to ensure the source consumer with the QOS service of minimum latency. The second counter (e.g. SB2) indicates a current bandwidth state of the resource requested by the corresponding source consumer (e.g. A2), so as to ensure the source consumer with the QoS service of sustain bandwidth.

A TDMA (Time Division Multiple Access) access method is applied in the present invention. With TDMA, the coupling timing between each source consumer terminal and each source provider terminal into a plurality of frames, and each frame is further divided into a plurality of slots. Wherein, each slot can transmit a fixed size of data. In the present embodiment, the number of the slots obtained from dividing a frame and the data size can be transmitted in each slot mentioned above are both predetermined by the SOC designer. Once the slots has been allocated to the source consumer terminal (including the source consumer which it couples with) via the operating procedure described in following embodiments, the source consumer terminal can access the source provider during the corresponding slot.

For describing the present embodiment of the present invention, it is assumed that the crossbar switching circuit 110 comprises three source consumer terminals respectively coupled to the source consumers A1~A3. In addition, in the present embodiment, the first counters ML1, ML2, and ML3 may be designed to count value from its initial value down to its predetermined value, and it can be alternatively disabled. For example, both the first counters ML1 and ML2 are enabled and its initial values are 1 and 2 respectively, and both of the predetermined values are 0. The first counter ML3 is disabled (which indicates the source consumer A3 does not require the QOS service of minimum latency). In the present embodiment, the second counters SB1, SB2, and SB3 are designed to count value from its initial value down to its predetermined value. For example, the initial values of the second counters SB1, SB2, and SB3 are 2, 1, and 3, respectively, and all of the predetermined values are 0.

It should be noted that even though the counters exemplified in the present invention are count-down counters, it will be apparent to one of the ordinary skill in the art that any other types of counters, which can count value from its initial value up/down to its predetermined value, can be applied to achieve the purpose of the present invention. In addition, the initial value and the predetermined value of each counter are both determined based on the requirement by the designer. Various modifications of the previous embodiment are still within the scope of the present invention.

Figures 2A, 2B:
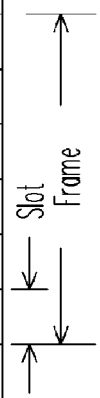
FIG. 2A schematically shows a timing diagram of the first counters ML1~ML3 and the second counters SB1~SB3 according to an embodiment of the present invention.
FIG. 2B schematically shows a diagram illustrating the concept of dividing the coupling timing between each source consumer terminal and each source provider terminal into a plurality of frames and a plurality of slots.

FIG. 2A schematically shows a timing diagram of the first counters ML1~ML3 and the second counters SB1~SB3 according to an embodiment of the present invention. FIG. 2B schematically shows a diagram illustrating the concept of dividing the coupling timing between each source consumer terminal and each source provider terminal into a plurality of frames and a plurality of slots. Referring to both FIGS. 2A and 2B, at time point T0, the counting values of the first counters ML1~ML3 and the second counters SB1~SB3 are all in an initial state. For example, the first counters ML1 and ML2 are both enabled and the initial values are 1 and 2, respectively. Meanwhile, the first counter ML3 is disabled. The initial values of the second counters SB1, SB2 and SB3 are 2, 1, and 3, respectively. Here, each frame is divided into 6 slots as shown in FIG. 2B.

Figure 3:
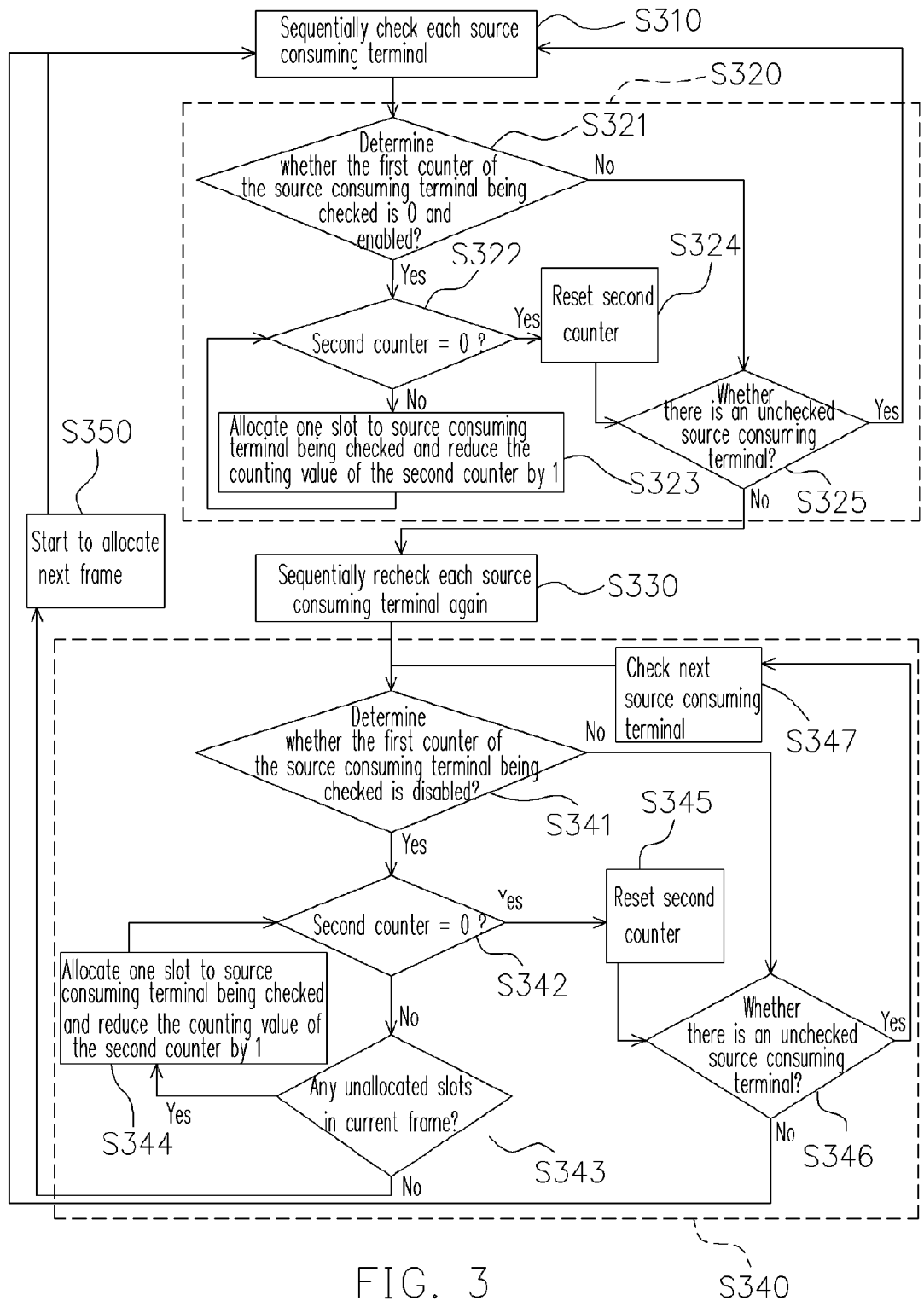
FIG. 3 schematically shows a flow chart illustrating a method of operating the crossbar switching circuit according to an embodiment of the present invention.

FIG. 3 schematically shows a flow chart illustrating a method of operating the crossbar switching circuit according to an embodiment of the present invention. In the present embodiment, when allocation of a new frame (e.g. at step S350) is initiated, each first counter (e.g. ML1~ML3) start to count a number of the elapsed frames. For example, the time point T6 shown in FIG. 2A is a starting point of another frame, thus both of the first counter ML1 and ML2 in the present embodiment count down one time, and its counting value are 0 and 1, respectively (meanwhile, the first counter ML3 is disabled). When the counter reaches its predetermined value (e.g. 0), the counter is reset to its initial value at the starting point of next frame (e.g. the first counter ML1 is reset to its initial value at time point T12).

At step S310, the first counters ML1~MLx of the source consumer terminals/source consumers are sequentially checked. In the present embodiment, the first counters are sequentially checked in an orderly sequence of ML1, ML2, ML3, . . . , MLx. At step S320, when it is determined that the first counter is enabled and has reached the corresponding predetermined value, a specific number of slots are allocated to the corresponding source consumer terminal based on the counting value of the corresponding second counter, then a next first counter is checked (step S310) until all of the first counters are being checked, then the process goes to step S330. At step S330, the first counters ML1~MLx of the source consumer terminals/source consumers are sequentially rechecked again. When it is determined that the first counter is disabled, a specific number of slots are allocated to the corresponding source consumer terminal based on the counting value of the corresponding second counter (step S340), and a next frame is allocated only after all slots in current frame are allocated (step S350), then steps S310~S350 are repeated.

The step S320 mentioned above may be implemented as follows. First, whether or not the first counter is enabled and has reached its corresponding predetermined value is determined (step S321). If yes, the process goes to step S322; otherwise, the process goes to step S325. At step S322, whether or not the second counter corresponding to the first counter has reached its predetermined value is determined. For example, if the first counter ML1 is being checked now, and ML1 is enabled and has reached its corresponding predetermined value (e.g. 0), at step S322, it is determined whether or not the second counter SB1 has reached its predetermined value (e.g. 0). If the second counter SB1 has not reached its predetermined value yet, a slot is allocated to its corresponding source consumer terminal/source consumer (e.g. A1). Meanwhile, the second counter counts the allocated slot for one time (e.g. counting-down one time) (step S323). Then, steps S322~S323 are repeated until the second counter has reached its predetermined value (which means that the sustain bandwidth requirement of the corresponding source consumer terminal/source consumer is fulfilled).

If the second counter has reached its predetermined value, the second counter is reset to its initial value (step S324), and then the process goes to step S325. At step S325, whether or not there is any unchecked first counter in the source consumer terminal/source consumer is determined. If yes, a next first counter is checked and the steps S321~S325 are repeated; otherwise, the process goes to step S330.

The step S340 mentioned above may be implemented as follows. First, whether or not the first counter is disabled is determined at step S341. If yes, the process goes to step S342; otherwise, the process goes to step S346. At step S342, whether or not the second counter corresponding to the first counter has reached its predetermined value is determined. For example, if the first counter ML1 is being checked now, and ML1 is disabled. At step S342, whether or not the second counter SB1 has reached its predetermined value (e.g. 0) is determined. If the second counter SB1 has not reached its predetermined value and there is any unallocated slot remaining in the current frame (step S343), a slot is allocated to its corresponding source consumer terminal/source consumer (e.g. A1). Meanwhile, the second counter counts the allocated slot for one time (e.g. counting-down one time) (step S344). Then, steps S342~S344 are repeated until the second counter has reached its predetermined value (which means that the sustain bandwidth requirement of the corresponding source consumer terminal/source consumer is fulfilled), then the process goes to step S345. Alternatively, steps S342~S344 are repeated until there are no unallocated slot remaining in the current frame, and then the process goes to step S350. At step S350, a next new frame is allocated, and then the process goes back to step S310.

If the second counter has reached its predetermined value, the second counter is reset to its initial value (step S345), and then the process goes to step S346. At step S346, whether or not there is any unchecked first counter in the source consumer terminal/source consumer. If yes, a next first counter is checked (step S347) and the steps S341~S346 are repeated; otherwise, the process goes back to step S310.

Referring to FIGS. 1, 2A, 2B, and 3. At time point T0, the values of the first counters ML1 and ML2 are 1, and 2 respectively, and ML3 is disabled. Such conditions do not satisfy the determining condition of step S321, thus the process goes to step S330. At step S330, each first counter is rechecked once again. At time point T0, only the first counter ML3 satisfies the determining condition of step S341, thus four slots are allocated to the source consumer terminal/source consumer A3, and the second counter SB3 down counts its value to 0 by repeating steps S342~S344 (at time points T0~T3). At time point T4, the second counter SB3 is reset to the initial value of 3, and steps S310~S340 are repeated. Therefore, the last two slots in the first frame are allocated to the source consumer terminal/source consumer A3.

Step S310 is performed every time when a new frame is started to be allocated. Since meanwhile the first counter ML1 has expired (i.e. 0), which means it is satisfied with the determining condition of step S321, three slots are allocated to the source consumer terminal/source consumer A1, and the second counter SB1 counts-down its value to 0 by repeating steps S322~S323 (at time points T6~T8). At time point T9, the second counter SB1 is reset to the initial value of 2, and since all other first counters are not satisfied with the determining condition of step S321, steps S330~S340 are performed to allocate the remaining slots to the source consumer terminal/source consumer A3.

When the allocation of a next new frame is initiated (at time point T12), since meanwhile the first counter ML2 has expired (i.e. 0), which means it is satisfied with the determining condition of step S321, two slots are allocated to the source consumer terminal/source consumer A2, and the second counter SB2 counts-down its value to 0 by repeating steps S322~S323 (at time points T12~T13). At time point T14, the second counter SB2 is reset to the initial value of 1, and since all other first counters are not satisfied with the determining condition of step S321, steps S330~S340 are performed to allocate the remaining slots to the source consumer terminal/source consumer A3.

Accordingly, by using the crossbar switching configuration and applying the TDMA (Time Division Multiple Access) access method and the first counter and the second counter to indicate the current latency state and the current bandwidth state of the resource requested by the source consumer terminal, it is possible to achieve a QOS service guaranteeing real time sustained bandwidth.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A crossbar switching circuit, for coupling a plurality of source providers to a plurality of source consumers according to requests of the plurality of source consumers, the crossbar switching circuit comprising:

a plurality of source consumer terminals, for coupling to the source consumers, respectively;

a plurality of source provider terminals, for coupling to the source providers, respectively;

a plurality of first counters, wherein one of the first counters is disposed in one of the source consumer terminals, and one of a plurality of first predetermined values and one of a plurality of first initial values are both preset in each of the first counters based on a request of the corresponding source consumer for indicating a current latency state of a resource requested by the corresponding source consumer; and a plurality of second counters, wherein one of the second counters is disposed in one of the source consumer terminals, and one of a plurality of second predetermined values and one of a plurality of second initial values are both preset in each of the second counters based on a request of the corresponding source consumer for indicating a current bandwidth state of the resource requested by the corresponding source consumer;

wherein, coupling states between the source consumer terminals and the source provider terminals are determined based on the states of the first counters and the second counters.

2. The crossbar switching circuit of claim 1, wherein a coupling timing between the source consumer terminals and the source provider terminals is divided into a plurality of frames, and each of the frames is further divided into a plurality of slots, wherein the first counter counts a number of the current frames each time when each of the frames is initiated.

3. The crossbar switching circuit of claim 2, wherein when the first counter corresponding to one of the source consumer terminals has reached the corresponding first predetermined value, a specific number of slots are allocated to the source consumer terminal based on a counting value of the second counter in the source consumer terminal.

4. The crossbar switching circuit of claim 3, wherein when the first counter corresponding to one of the source consumer terminals is disabled, a specific number of slots are allocated to the source consumer terminal based on the counting value of the second counter in the source consumer terminal.

5. The crossbar switching circuit of claim 1, wherein the source providers are memories.

6. A method of operating a crossbar switching circuit including a plurality of source consumer terminals, a plurality of source provider terminals, a plurality of first counters and a plurality of second counters, wherein one of the first counters and one of the second counters are disposed in one of the source consumer terminals, a coupling timing between the source consumer terminals and the source provider terminals is divided into a plurality of frames, and each of the frames is further divided into a plurality of slots, the method comprises:

counting a number of the elapsed frames starting from the corresponding first initial value by each of the first counters;

checking the first counters in each of the source consumer terminals;

allocating a specific number of slots to the corresponding source consumer terminal based on a counting value of the corresponding second counter when one of the first counters has reached the corresponding first predetermined value; and allocating a specific number of slots to the corresponding source consumer terminal based on the counting value of the corresponding second counter when one of the first counters is disabled.

7. The method of operating the crossbar switching circuit of claim 6, wherein the step of allocating a specific number of slots to the corresponding source consumer terminal based on a counting value of the corresponding second counter when one of the first counters has reached the corresponding first predetermined value comprises:

allocating a slot to the corresponding source consumer terminal, and enabling the corresponding second counter to count the number of the allocated slot when the corresponding second counter has not reached the second predetermined value; and resetting the second counter to the corresponding second initial value when the corresponding second counter has reached the second predetermined value.

8. The method of operating the crossbar switching circuit of claim 6, wherein the step of allocating a specific number of slots to the corresponding source consumer terminal based on the counting value of the corresponding second counter when one of the first counters is disabled comprises:

allocating a slot to the corresponding source consumer terminal and enabling the corresponding second counter to count the number of the allocated slot when the corresponding second counter has not reached the second predetermined value; and resetting the second counter to the corresponding second initial value when the corresponding second counter has reached the second predetermined value.

9. The method of operating the crossbar switching circuit of claim 6, further comprising:

allocating the slots of next frame when all of the slots in the current frame had been allocated.

* * * * *